Dec. 8, 1970          W. C. GRIFFIN                3,546,529
        HIGH INTENSITY SHAPED PULSE ELECTRONIC LIGHT SOURCE
                       FOR HIGH SPEED CAMERAS
                       Filed Oct. 16, 1968

*INVENTOR.*
WILLIAM C. GRIFFIN

*BY* ROY MILLER
   ATTORNEY.
   GERALD F. BAKER
   AGENT.

United States Patent Office 3,546,529
Patented Dec. 8, 1970

3,546,529
HIGH INTENSITY SHAPED PULSE ELECTRONIC LIGHT SOURCE FOR HIGH SPEED CAMERAS
William C. Griffin, Ridgecrest, Calif., assignor to the United States of America as represented by the Secretary of the Navy
Filed Oct. 16, 1968, Ser. No. 767,936
Int. Cl. H05b 37/00
U.S. Cl. 315—241      2 Claims

ABSTRACT OF THE DISCLOSURE

A pulse former is provided to modify the shape of the light output from an electronic flash lamp. The circuit, which provides a 5.0 millisecond interval, is a modified Guillemin type B voltage-fed network. The circuit is designed to be used with a gaseous discharge tube of the type often referred to as the "Edgerton" flash lamp.

GOVERNMENT INTEREST

The invention described herein may be manufactured and used by or for the government of the United States of America for governmental purposes without the payment of any royalties thereon or therefor.

BACKGROUND OF THE INVENTION

Various methods of photographing high-speed projectiles have been tried with varying degrees of success. Illumination has been provided by the argon flash, photoflash lamps, flash powder, carbon arcs, incandescent sources, electronic flash and other means. Although the electronic flash generally has advantages over other methods, the shape of the light pulse has been far from uniform. To obtain satisfactory terminal ballistic photographs of projectiles it is necessary that the film motion be synchronized with the movement of the image, that the camera track the object, or that the exposure time be very short in order to reduce image motion to a degree that is not objectionable according to the data reduction requirement.

The method using a very short exposure, with or without image compensation, presents several problems. The most difficult of these is that of obtaining adequate illumination for reflected light photographs at very high framing rates and exposure times of 10 microseconds or less for a sufficient number of frames to cover the area of interest.

SUMMARY OF THE INVENTION

The present invention relates to a system of photography using a very short exposure with a high intensity electronic light source. The light source is powered by a modified Guillemin type "B" voltage-fed network which provides a 5.0 millisecond interval when used with an electronic flashlamp, for example, the General Electric FT617-40 flashlamp. The apparatus according to this invention provides more than adequate illumination for photographing high speed objects by reflected light. The invention allows the use of shorter exposure times to stop image motion, allows smaller aperture openings to be used providing better depth of field, extends the time range for uniform light output, and increases available light intensity.

DESCRIPTION OF THE PREFERRED EMBODIMENT

Figure 1:
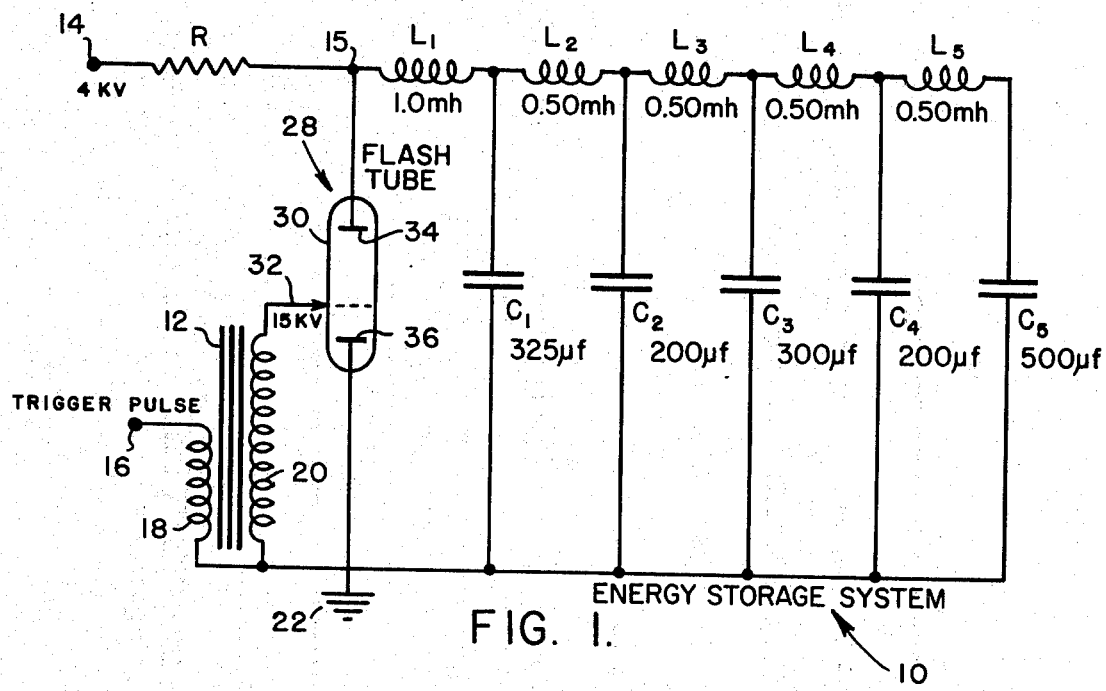
FIG. 1 is a schematic of the pulse forming network of the system according to the invention.

As shown in FIG. 1, the flash producing system according to the invention comprises a flash tube 28 and an energy storage system 10 connected to an energy source 14 of 4 kv. The energy source 14 is connected to the system through resistor R. The flash tube 28 has two electrodes 34, 36, one of which is connected to junction 15 between $L_1$, and resistor R and the other of which is connected to ground 22. The flash tube is triggered through trigger electrode 32 by a 15 kv. pulse from secondary coil 20 of transformer 12 when a 250 volt trigger pulse is applied to lead 16 of primary coil 18.

The energy storing means 10 is a pulse forming network patterned after the Guillemin type "B" voltage-fed network.[1] The energy storage means 10 which comprises inductances $L_1$, $L_2$, $L_3$, etc., and capacitances $C_1$, $C_2$, $C_3$, etc., is designed to provide a discharge pulse with a flat top.

Figure 2:
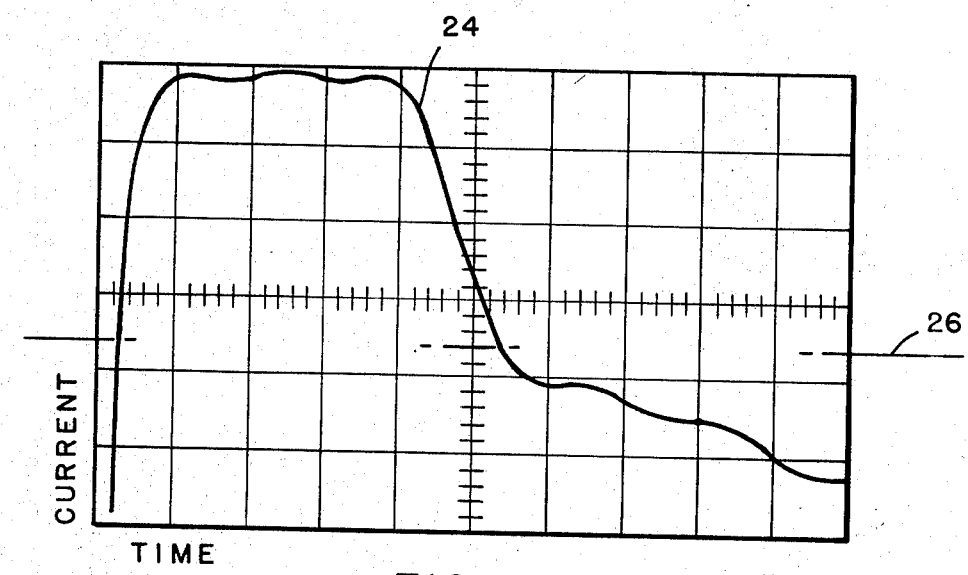
FIG. 2 is a graphic representation of the light output pulse in terms of current measurement.

FIG. 2 shows a typical oscilloscope trace of the pulse provided by the energy storage means according to the invention. The trace 24 represents current flowing during a period of time. It has been found that the current flowing with a value higher than the lower ⅓ of the output, for example as delineated at 26, gives sufficient illumination for the purposes desired. Thus, it may be seen that the present invention provides a 5.0 millisecond interval of useable light. About 50 pictures can be made by a high speed camera with a PPS rate of around 10,000 during this time.

When loaded with a General Electric FT617-40 flashlamp the circuit shown in FIG. 1 provides more than adequate illumination for photographing high speed objects by reflected light.

Similar networks have been suggested for use in flashlamp operation but the tendency has been to use a great many LC sections of substantially equal value. It is a feature of this invention that fewer LC sections are used with unbalanced values but providing an unexpectedly long duration flattened pulse.

An electric flash producing system manufactured according to the present invention, and exhibiting the characteristics disclosed, comprised the following components with reference to FIG. 1.

Lamp 30—GE. FT617-40
Resistor R—500Ω; 400 w.
Inductor $L_1$—1.0 mh.
Inductor $L_2$—0.50 mh.
Inductor $L_3$—0.50 mh.
Inductor $L_4$—0.50 mh.
Inductor $L_5$—0.50 mh.
Capacitor $C_1$—325 µf.
Capacitor $C_2$—200 µf.
Capacitor $C_3$—300 µf.
Capacitor $C_4$—200 µf.
Capacitor $C_5$—500 µf.

The total resistance of the unsymmetrical network matches the resistance of the fully loaded flashlamp. This has resulted in illumination of a greater area to a higher level with greater uniformity and the longer duration now allows twice the number of pictures of each event.

The greater intensity of the lighting makes exposure times of one microsecond, or less, practical for high quality reflected light photographs.

---
[1] MIT Radiation Laboratory Series, 1948, volume 5 page 201.

What is claimed is:
1. A high intensity illuminating system comprising:
illumination means including
a pair of main electrodes, and a trigger electrode;
electric energy storage means;
a charging circuit for the energy storage means;
a discharge circuit for the energy storage means connected to said main electrodes;
means for supplying a triggering impulse to said trigger electrode to cause discharge of said discharge circuit across said main electrode;
said illuminating means having a determinable impedance under load conditions;
said charging circuit comprising five asymmetrical inductance capacitance sections; and
said energy storage means having an impedance closely matching that of the illuminating means under load.

2. A high intensity illuminating system comprising:
illumination means including
a pair of main electrodes, and
a trigger electrode;
electric energy storage means;
a charging circuit for the energy storage means;
a discharge circuit for the energy storage means connected to said main electrodes;
said energy storage means being designed to have an impedance closely matching that of the illuminating means under load;
means for supplying a triggering impulse to said trigger electrode to cause discharge of said discharge circuit across said main electrode;
said illuminating means having a determinable impedance under load conditions;
said charging circuit comprising an asymmetrical series of five inductance-capacitance sections constituted as follows.

| Inductance (mh.): | Capacitance (pf.) |
|---|---|
| (1) 1.0 | 325 |
| (2) 0.50 | 200 |
| (3) 0.50 | 300 |
| (4) 0.50 | 200 |
| (5) 0.50 | 500 |

References Cited

UNITED STATES PATENTS 2,577,512  12/1951  Cooper et al. _____ 315—17
3,444,431  5/1969  Goldberg _____ 315—200

JAMES D. KALLAM, Primary Examiner

R. F. POLISSACK, Assistant Examiner

U.S. Cl. X.R.

315—167, 168, 175, 176, 209, 240, 242, 243, 244